(12) United States Patent
Amponsah

(10) Patent No.: US 10,663,484 B2
(45) Date of Patent: May 26, 2020

(54) MULTIPLE INTEGRATED TIPS SCANNING PROBE MICROSCOPE WITH PRE-ALIGNMENT COMPONENTS

(71) Applicant: Xallent, LLC, Ithaca, NY (US)

(72) Inventor: Kwame Amponsah, Ithaca, NY (US)

(73) Assignee: Xallent, LLC, Ithaca, NY (US)

( * ) Notice: Subject to any disclaimer, the term of this patent is extended or adjusted under 35 U.S.C. 154(b) by 88 days.

(21) Appl. No.: 15/896,638

(22) Filed: Feb. 14, 2018

(65) Prior Publication Data

US 2019/0250186 A1 Aug. 15, 2019

(51) Int. Cl.
*G01Q 60/38* (2010.01)
*G01Q 70/06* (2010.01)
*G01Q 60/30* (2010.01)
*G01Q 70/02* (2010.01)

(52) U.S. Cl.
CPC ............ *G01Q 60/38* (2013.01); *G01Q 60/30* (2013.01); *G01Q 70/02* (2013.01); *G01Q 70/06* (2013.01)

(58) Field of Classification Search
CPC ......... G01Q 60/38; G01Q 60/30; G01Q 70/06
USPC ......................................................... 850/33
See application file for complete search history.

(56) References Cited

U.S. PATENT DOCUMENTS 4,992,660 A    2/1991   Kobayashi
5,148,103 A *   9/1992   Pasiecznik, Jr. ..... G01R 1/0735
                                                   324/754.08
5,426,302 A    6/1995   Marchman et al.
5,436,448 A    7/1995   Hosaka et al.
5,666,190 A    9/1997   Quate et al.
5,994,698 A   11/1999   Kawade et al.
(Continued)

FOREIGN PATENT DOCUMENTS

CN   1159001   9/1997
CN   1160193   9/1997
(Continued)

OTHER PUBLICATIONS

Yoomin, Ahn et al. "Si multiprobes integrated with lateral actuators for independent scanning probe applications; AFM Si multiprobes with lateral actuators" Journal of Micromechanics & Microengineering, Institute of Physics Publishing, Bristol, GB, vol. 15, No. 6, Jun. 1, 2005, pp. 1224-1229; doi: 10.1088/0960-1317/15//6/012.
(Continued)

*Primary Examiner* — Michael Maskell
(74) *Attorney, Agent, or Firm* — Bond, Schoeneck & King, PLLC

(57) ABSTRACT

Device and system for characterizing samples using multiple integrated tips scanning probe microscopy. Multiple Integrated Tips (MiT) probes are comprised of two or more monolithically integrated and movable AFM tips positioned to within nanometer of each other, enabling unprecedented micro to nanoscale probing functionality in vacuum or ambient conditions. The tip structure is combined with capacitive comb structures offering laserless high-resolution electric-in electric-out actuation and sensing capability. This "platform-on-a-chip" approach is a paradigm shift relative to current technology based on single tips functionalized using stacks of supporting gear: lasers, nano-positioners and electronics.

20 Claims, 14 Drawing Sheets

(56) References Cited

U.S. PATENT DOCUMENTS

| | | | | |
|---|---|---|---|---|
| 6,078,186 | A * | 6/2000 | Hembree | G01R 31/2886 324/750.19 |
| 7,349,223 | B2 * | 3/2008 | Haemer | G01R 1/07314 29/593 |
| 7,397,087 | B2 | 7/2008 | Chinthakindi et al. | |
| 7,872,482 | B2 | 1/2011 | Chong et al. | |
| 8,056,402 | B2 | 11/2011 | Hecker et al. | |
| 8,440,523 | B1 | 5/2013 | Guillom et al. | |
| 8,575,954 | B2 * | 11/2013 | Chong | G01R 3/00 324/754.07 |
| 10,048,289 | B2 | 8/2018 | Lal et al. | |
| 2002/0153583 | A1 | 10/2002 | Frazier et al. | |
| 2003/0020500 | A1 | 1/2003 | Altmann et al. | |
| 2004/0004182 | A1 | 1/2004 | Kranz et al. | |
| 2004/0157350 | A1 | 8/2004 | McQuade et al. | |
| 2004/0223309 | A1 * | 11/2004 | Haemer | G01R 1/07314 361/767 |
| 2006/0027878 | A1 | 2/2006 | Chinthakindi et al. | |
| 2006/0257286 | A1 | 11/2006 | Adams | |
| 2007/0234786 | A1 | 10/2007 | Moon | |
| 2008/0246500 | A1 * | 10/2008 | Chong | G01R 31/50 324/754.14 |
| 2008/0258059 | A1 | 10/2008 | Saito et al. | |
| 2009/0001488 | A1 | 1/2009 | Magana et al. | |
| 2009/0114000 | A1 | 5/2009 | Hecker et al. | |
| 2010/0071098 | A1 | 3/2010 | Mirkin et al. | |
| 2010/0115671 | A1 | 5/2010 | Pryadkin et al. | |
| 2010/0154085 | A1 | 6/2010 | Maruyama et al. | |
| 2010/0205698 | A1 | 8/2010 | Faucher et al. | |
| 2010/0229265 | A1 | 9/2010 | Jin et al. | |
| 2010/0244867 | A1 | 9/2010 | Chong et al. | |
| 2010/0257643 | A1 | 10/2010 | Reifenberger et al. | |
| 2010/0263098 | A1 | 10/2010 | Müller et al. | |
| 2011/0055982 | A1 * | 3/2011 | Watanabe | G01Q 10/02 850/2 |
| 2011/0126329 | A1 | 5/2011 | Despont et al. | |
| 2013/0249584 | A1 * | 9/2013 | Lou | G01R 31/2891 324/755.07 |
| 2014/0331367 | A1 | 11/2014 | Lal et al. | |
| 2016/0252545 | A1 * | 9/2016 | Amponsah | G01Q 20/02 850/6 |
| 2016/0252546 | A1 | 9/2016 | Amponsah | |
| 2017/0261544 | A1 * | 9/2017 | Amponsah | G01R 1/06755 |
| 2018/0149673 | A1 | 5/2018 | Huo et al. | |

FOREIGN PATENT DOCUMENTS

| | | |
|---|---|---|
| CN | 2465175 | 12/2001 |
| CN | 2488061 | 4/2002 |
| CN | 1416523 | 5/2003 |
| CN | 101920338 | 12/2010 |
| CN | 103235158 | 8/2013 |
| CN | 104087505 | 10/2014 |
| CN | 104105655 | 10/2014 |
| EP | 1085327 | 6/2006 |
| JP | H07120482 | 5/1995 |
| JP | 2005507175 | 3/2005 |
| JP | 2005300177 | 10/2005 |
| JP | 2010526284 | 7/2010 |
| JP | 4685309 | 5/2011 |
| KR | 20090128186 | 12/2009 |
| WO | 0120347 | 3/2001 |
| WO | 03019238 | 3/2003 |
| WO | 2011159351 | 12/2011 |
| WO | 2013090887 | 6/2013 |
| WO | 2014041677 | 3/2014 |
| WO | 2014114860 | 7/2014 |

OTHER PUBLICATIONS

Ming-Dou Ker, et al., "Fully Process-Compatible Layout Design on Bond Pad to Improve Wire Bond Reliability in CMOS ICs", IEEE Transaction on Components and Packaging Technologies, IEEE Service Center, Piscataway, NJ, US, Vo. 25, No. 2, Jun. 1, 2002 (Jun. 1, 2002), pp. 309-316, XP011070771, ISSN: 1521-3331; figures 1-7.

Koester, S. J. et al. "Wafer-level 3D integration technology", IBM Journal of Research and Development, International Business Machines Corporation, New York, NY, US, vol. 52, No. 6, Nov. 1, 20008 (Nov. 1, 2008), XP002676160, ISSN: 0018-8646, DOI: 10.1147/JRD.2008.5388565, pp. 583-597.

Song, Z.G. et al., "Front-end processing defect localization by contact-level passive voltage contrast technique and root cause analysis", Physical and Failure Analysis of Integrated Circuits, 2002, IPFA 2002, proceedings of the 9th International Symposium on the Jul. 8-12, 2002, Piscataway, NJ, USA, IEEE, Jul. 8, 2002 (Jul. 8, 2002), XP010597768, ISBM: 978-0-7803-7416-4, pp. 97-100.

* cited by examiner

MULTIPLE INTEGRATED TIPS SCANNING PROBE MICROSCOPE WITH PRE-ALIGNMENT COMPONENTS

FIELD OF THE INVENTION

The present disclosure is directed generally to a multiple integrated tips scanning probe microscope for the characterization of thin films, devices and biological entities.

BACKGROUND

Single-tip Scanning Probe Microscopes (SPM), such as the Scanning Tunneling Microscope (STM) and Atomic Force Microscope (AFM), are critical tools for the investigation of structural and electronic properties of thin film materials and devices. For example, these single-tip SPMs form one or more images of a thin film material or device using a physical probe that scans the target.

However, single-tip SPMs are limited to static measurements such as the local density of states and near-sample surface effects. As a result, a range of fundamental phenomena that exist in thin film materials and devices are inaccessible. As just one example, the effects of dislocations and grain boundaries in thin films cannot be characterized, as the ability to perform trans-conductance (conduction between two tips) measurements at the nanoscale is a critical gap. Trans-conductance would enable a richer understanding of how electrons transport and interact with their surroundings by offering insight into the local density of states, tip-sample coupling, transport mechanisms, scattering phase shifts and inelastic free mean paths of electrons.

Multiple-tips SPMs have been proposed as a way of overcoming the inherent limitations of the single-tip SPM. However, there have been significant challenges to engineering a suitable multiple-tips SPM. Previous approaches to a multiple-tips SPM have relied on independent macroscopically-fabricated probes. These platforms are complex, difficult to actuate, and have limited scale-down. They are also prohibitively expensive to manufacture.

Accordingly, there is a continued need in the art for multiple-tips SPMs that are both cost-effective and easily manufactured and functionalized to the specific investigation for which they will be utilized.

SUMMARY OF THE INVENTION

The present disclosure is directed to a multiple integrated tips (MiT) scanning probe microscope for the characterization of thin films and devices. The MiT scanning probe microscope is a platform that integrates mechanical and electrical functionality in a monolithically-fabricated nanostructure which is tailored and functionalized to the specific investigation. The MiT probe provides two or more monolithically integrated cantilever tips that can be placed within nanometers of each other, with monolithically integrated capacitive actuators, sensors, and transistors to amplify signals. As a result, the MiT SPM is able to perform atomic force microscopy without the need for laser tip alignment. Further, the MiT SPM is capable of nanoprobing surfaces where at least two of the integrated tips are in direct contact or in close proximity with the sample.

According to an aspect is a scanning probe adapter comprising a probe head having a probe with at least a probe tip affixed to the topside of a single substrate, the single substrate has at least an alignment feature; and a microscope configured to view the probe tip in relation to a sample.

According to an embodiment, the alignment feature is either a through-hole, indent, pole or a pattern.

According to an embodiment, the probe is aligned and mounted onto a board component.

According to an embodiment, the board component has at least an alignment feature which is aligned to the alignment feature on the probe.

According to an embodiment, the alignment feature is either a through-hole, indent, pole, pattern or a raised edge.

According to an embodiment, the probe is affixed to a board component and the board component is further affixed to a first component.

According to an embodiment, the first component has at least a raised edge for aligning the board component in a predefined orientation in relation to the sample surface.

According to an embodiment, the first component has at least a fastener on the front side and backside.

According to an embodiment, the fastener is a metal plate.

According to an embodiment, the fastener is a magnet.

According to an embodiment, the probe is affixed to a board component, and the board component is further affixed to a first component, and the first component is further fastened to a prober stand.

According to an embodiment, the probe is affixed to a board component, and the board component is further fastened to a prober stand.

According to an embodiment, the prober stand has at least a raised edge for aligning the board component or the first component in a predefined orientation in relation to the sample surface.

According to an embodiment, the prober stand is mounted onto at least a moving stage.

According to an embodiment, the stage is a rotating stage or a linear stage or a hexapod stage.

According to an embodiment, the probe and board component are monolithically integrated as a single unit on a single substrate. According to an embodiment, the single unit is mounted onto a first component or the prober stand.

According to an embodiment, the probe head houses a top component.

According to an embodiment, the top component houses at least a spring-loaded electrode, wherein said spring-loaded electrode is configured to push against and make electrical contact to a board component or a probe comprising the probe tips.

According to an embodiment, the top component is integrated with at least a stage or at least an actuator, the stage or actuator allows for various degrees of freedom of motion of the top component.

According to an embodiment, the stage or actuator retracts to push the spring-loaded electrode against and make electrical contact to either a board component or a probe comprising the probe tips or extends to disengage contact between the spring-loaded electrode and a board component or a probe comprising the probe tips.

According to an embodiment, is a method of mounting a probe to a scanning probe microscope adapter, the method comprising the steps of: (i) using at least a stage or at least an actuator which is connected to the top component to extend the top component, (ii) using a probe arm of a probe handler to pick up a probe or a board component which houses a probe, (iii) rotating and moving the probe arm of the probe handler to position the spring-loaded electrode of the top component above the topside of the probe, (iv) retracting the at least a stage or at least an actuator which is connected to the top component to push the spring-loaded electrodes against and make electrical contact to a board component or a probe comprising the probe tips.

According to an embodiment, the probe arm picks up the board component or a probe comprising the probe tips from a probe cassette.

According to an embodiment, is a method of demounting a probe from a scanning probe microscope adapter, the method comprising the steps of: (i) using at least a stage or at least an actuator which is connected to the top component to extend the top component in order to disengage contact between at least a spring-loaded electrode and the board component which houses a probe or a probe comprising the probe tips, (ii) using the probe arm of a probe handler to pick up the probe or a board component which houses a probe, (iii) moving and rotating the probe arm.

According to an embodiment, the probe arm inserts the board component or a probe comprising the probe tips into a probe cassette.

These and other aspects of the invention will be apparent from the embodiment(s) described hereinafter.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

The present disclosure describes various embodiments of a multiple integrated tips scanning probe microscope for the characterization of thin films and devices. The MiT-SPM enables nanoscale atomic imaging, as well as electrical probing of trans-conductance, in ambient air and vacuum. The device provides for detailed studies of transport mechanisms in thin film materials and devices.

Figure 1:
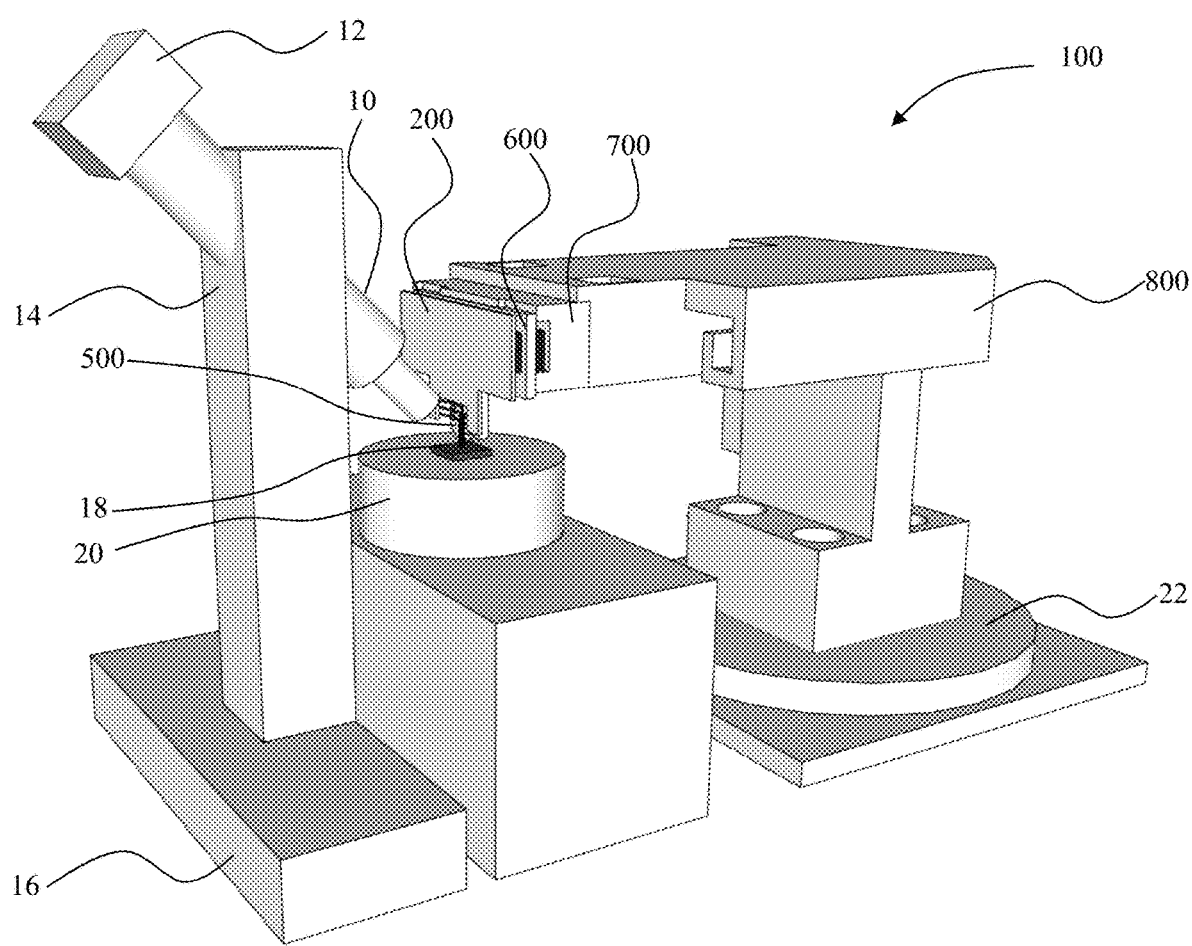
FIG. 1 is an image of a multiple integrated tips scanning probe microscope, in accordance with an embodiment.

Referring now to the drawings, wherein like reference numerals refer to like parts throughout, there is seen in FIG. 1, in one embodiment, multiple integrated tips scanning probe microscope 100. The probe 500 is attached to a board component 600. The board component is further attached to a first component 700 which is further attached to a prober stand 800. The prober stand 800 is mounted on top of either a linear stage 22, rotary stage 22, hexapod stage 22 or a combination of linear, rotary or hexapod stages. To source and measure signals from the probe tips, a top component 200 with spring-loaded electrodes pushes against the contact pads on the probe 500. A microscope 10 with a camera 12 is used to view the probe tips in relation to sample 18. The microscope 10 is connected to either a linear stage 16, rotary stage 16, hexapod stage 16 or a combination of linear, rotary and hexapod stages through a post 14. The sample 18 under investigation is mounted onto XYZ linear stages 20. The linear stages could be a combination of piezoelectric and manual translation stages. A rotational stage could be mounted on top or below the stages 20 to offer rotational alignment of the sample in relation to the probe tips. The stages 20 could also be a hexapod offering six degrees of freedom.

Figure 2:
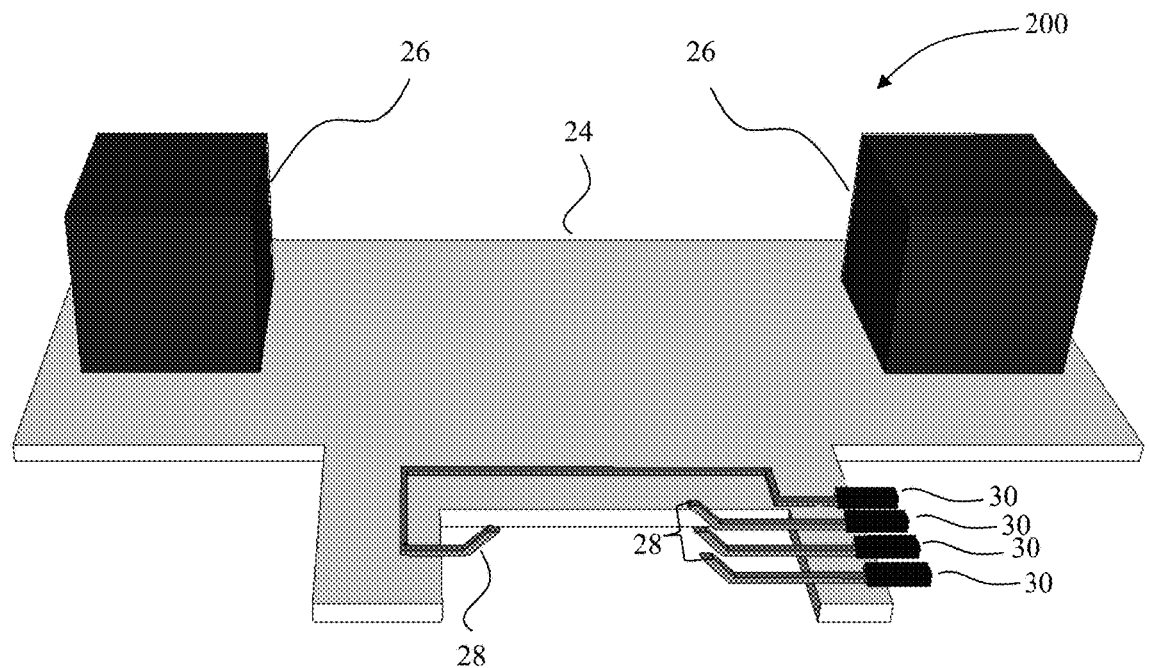
FIG. 2 is an image of a top component with spring-loaded electrodes for contacting the probe or board component, in accordance with an embodiment.

Referring now to FIG. 2, in one embodiment, a top component 200 consisting of a substrate 24, magnet 26, spring-loaded electrode 28 and connector 30. The spring-loaded electrodes could be made of oxidation resistant metals such as platinum and gold or other metals such as tungsten, nickel, copper, etc. External electrical signals are connected to the top component through connectors 30. The magnets 26 are used to affix the top component to the entire adapter assembly.

Figure 3:
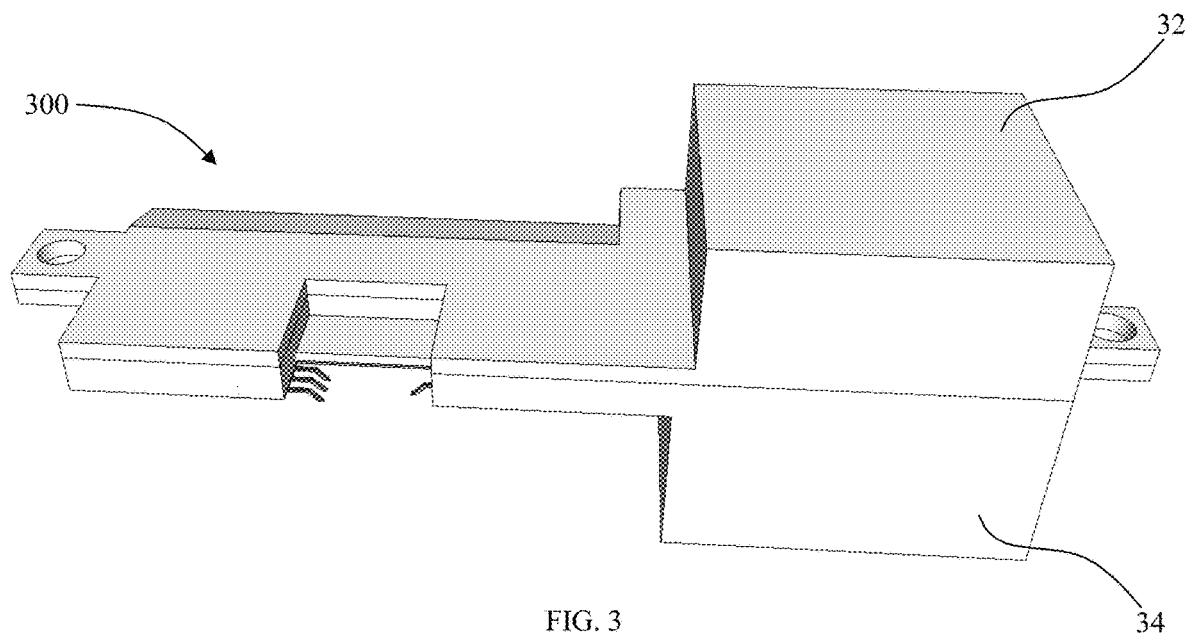
FIG. 3 is an image of a packaged top component with spring-loaded electrodes for contacting the probe or board component, in accordance with an embodiment.

Referring now to FIG. 3, in one embodiment, the top component 200 is packaged with a top 32 and bottom 34 plates.

Figure 4:
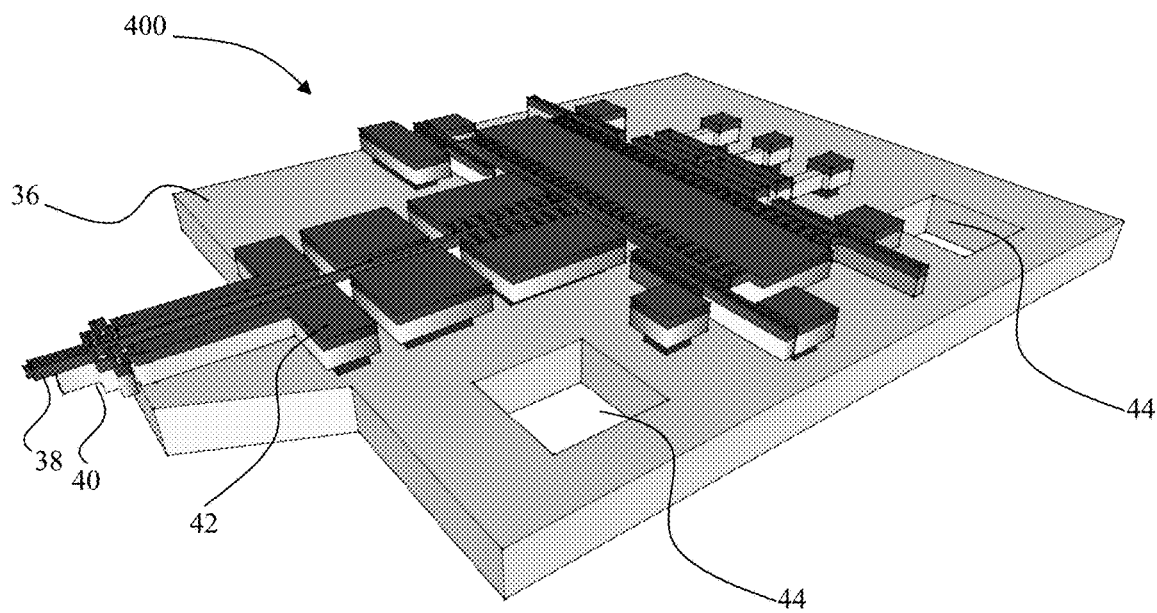
FIG. 4 is an angled view image of an MiT probe, in accordance with an embodiment.
Figure 5:
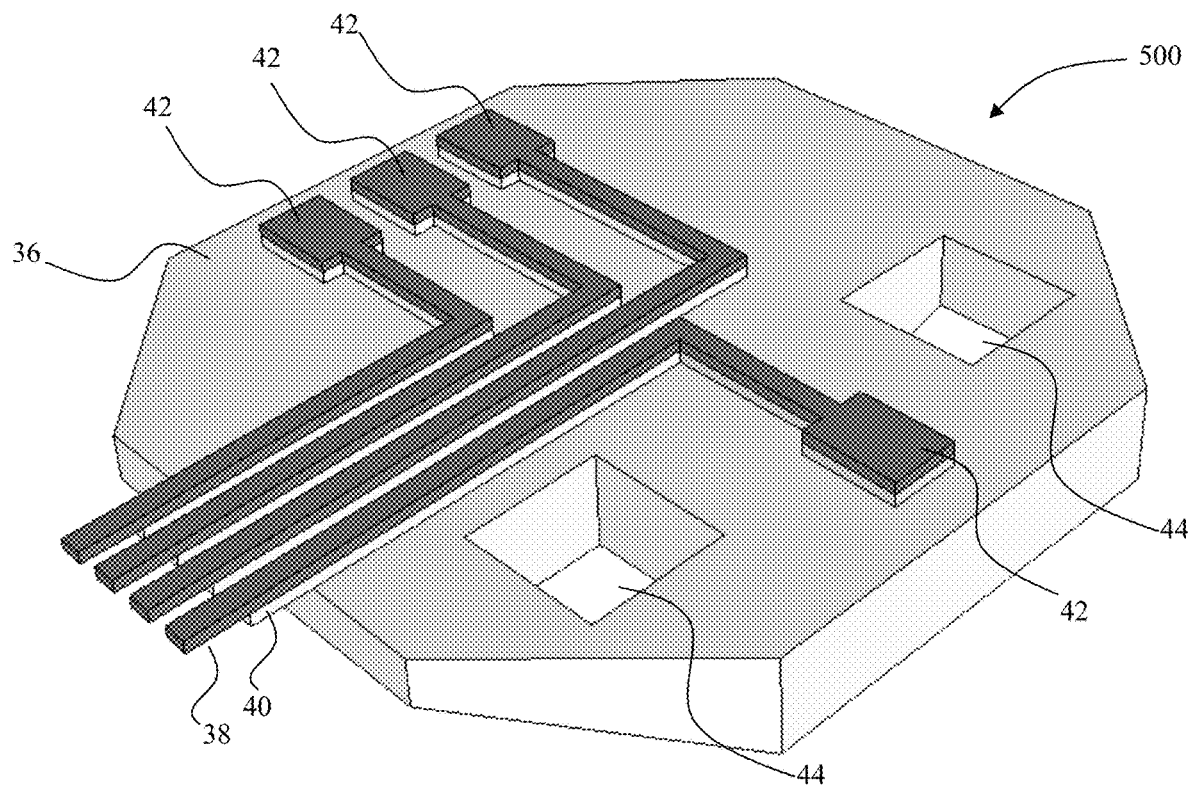
FIG. 5 is an angled view image of an MiT probe, in accordance with an embodiment.

Referring now to FIG. 4, in one embodiment, is a multiple integrated tip probe. Standard CMOS and MEMS processing could be used to fabricate the MiT probe. Multiple probe tips 38 on support layer 40 are fabricated on the topside of a substrate 36. The spring-loaded electrodes 28 on the top component 200 are brought into contact with the contact pads 42 on the MiT probe 400. The substrate 36 has an alignment feature which is either at least a through-hole 44, at least an indent on the backside, at least a pole on the bottom-side or a pattern. The alignment feature allows the probe to be mounted and aligned at a predefined orientation in relation to the sample surface Referring now to FIG. 5, in one embodiment, the MiT probe is a four point probe 500 with the probe tips 38 attached to a support layer 40. The substrate 36 has an alignment feature which is either at least a through-hole 44, at least an indent on the bottom-side, at least a pole on the backside or a pattern. The alignment feature allows the probe to be mounted and aligned at a predefined orientation in relation to the sample surface According to an embodiment, the substrate 36 could be transparent. Thus, instead of making a through-hole or an indent, alignment features could be patterned on the substrate 36 which could subsequently be aligned to features on a probe carrier or a board component. Lithography, deposition or etching techniques could be used to create the alignment pattern on the substrate 36.

According to an embodiment, the probe is mounted onto a board component where the board component also has alignment features. The alignment features could be through-hole, indent, pole, pattern and a raised edge.

Figure 6A:
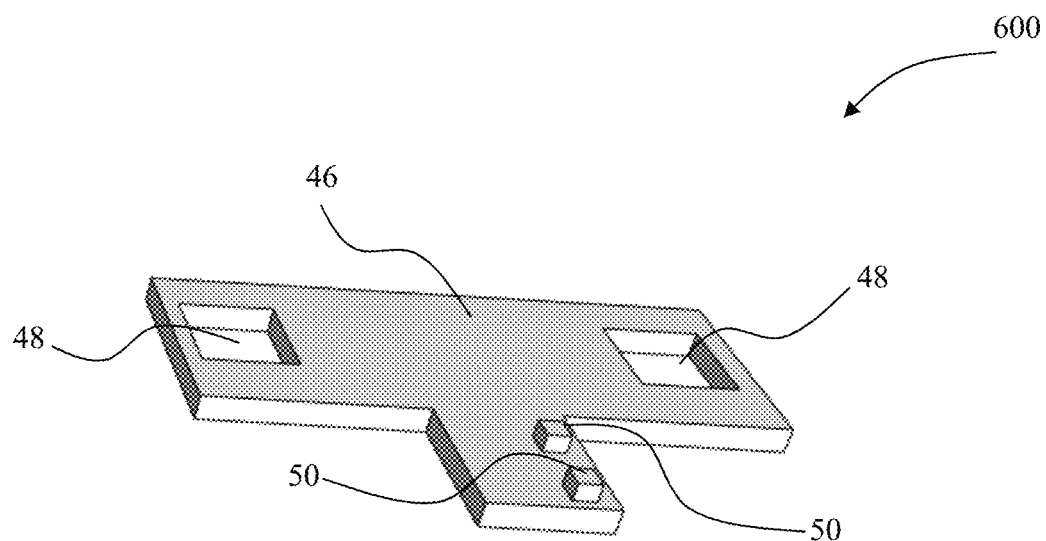
FIG. 6A is an image of a board component, in accordance with an embodiment.

Referring now to FIG. 6A, in one embodiment, the probe is mounted unto a board component 600. The component's substrate 46 could be made from PCB, plastic, semiconductor, metal or any material with structural stability. The component has at least a through-hole 48, and a pole 50. The holes 44 on the MiT probe are aligned and inserted into the poles 50 of component 600. Wires could be bonded from the probe to the board component 600 and the spring-loaded electrode 28 could make contact to the board component 600 or the probe. A fastener or adhesive such as carbon or copper tape could be used to securely affix the probe to the board component.

Figure 6B:
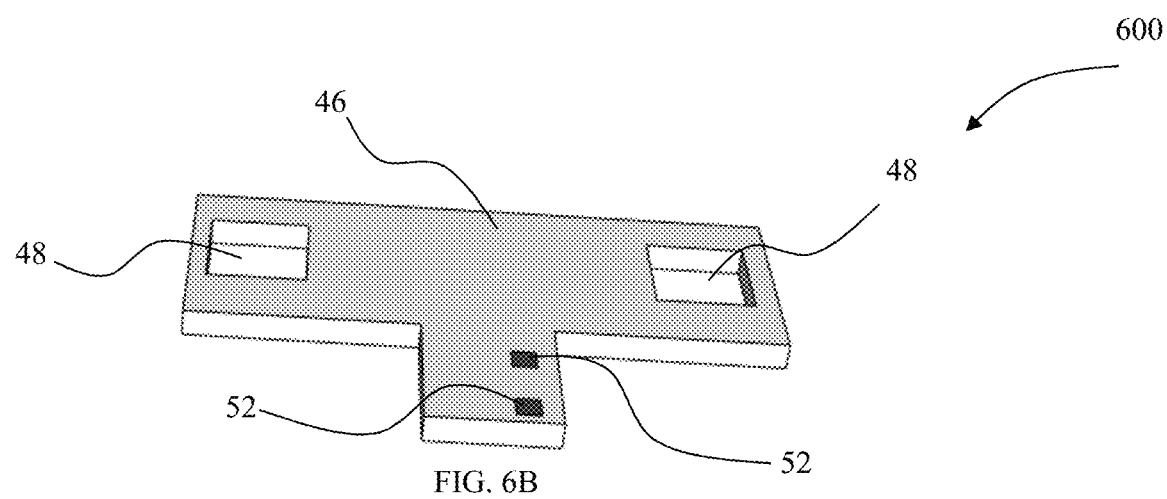
FIG. 6B is an image of a board component, in accordance with an embodiment.

Referring now to FIG. 6B, in one embodiment, alignment feature 52 is patterned on the board component 600. An alignment feature on a probe with a transparent substrate 36 is aligned to the alignment feature 52 on the board component 600.

Figure 6C:
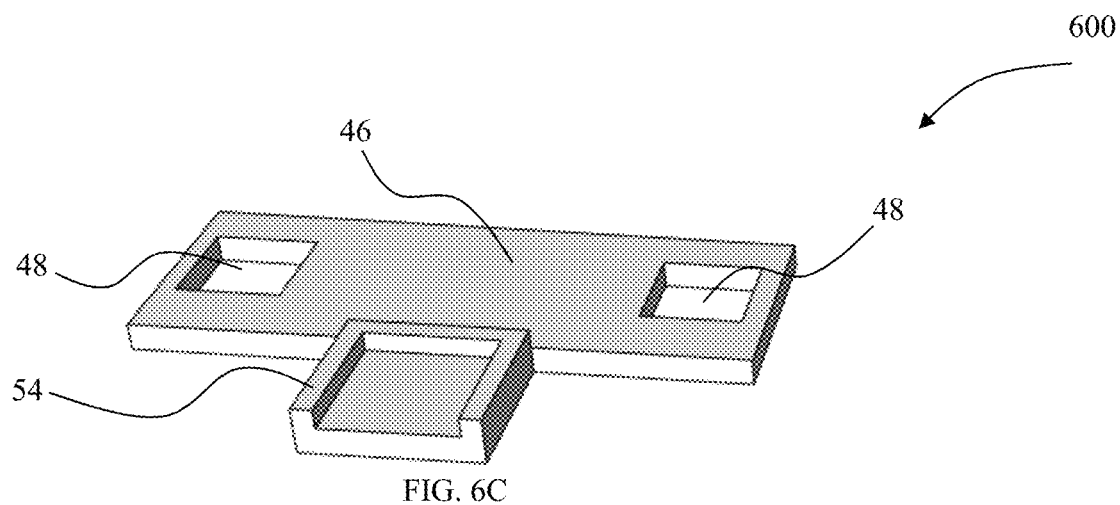
FIG. 6C is an image of a board component, in accordance with an embodiment.

Referring now to FIG. 6C, in one embodiment, the board component 600 has a raised edge 54. A probe could be mounted and securely pushed against the raised edges to align the probe in a predefined orientation in relation to the sample surface.

Figure 6D:
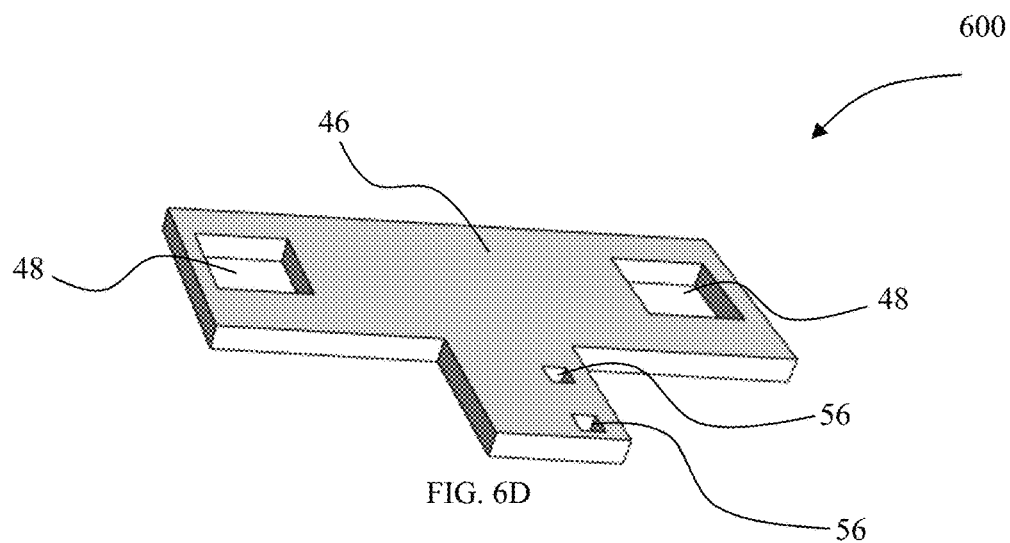
FIG. 6D is an image of a board component, in accordance with an embodiment.

Referring now to FIG. 6D, in one embodiment, the board component 600 has a through-hole 56 which aligns with a through-hole 44 of the probe. Additionally, an etched pole at the bottom-side of substrate 36 of the probe could be inserted into the through-hole 56 in order to align the probe in a predefined orientation in relation to the sample surface.

Figure 7:
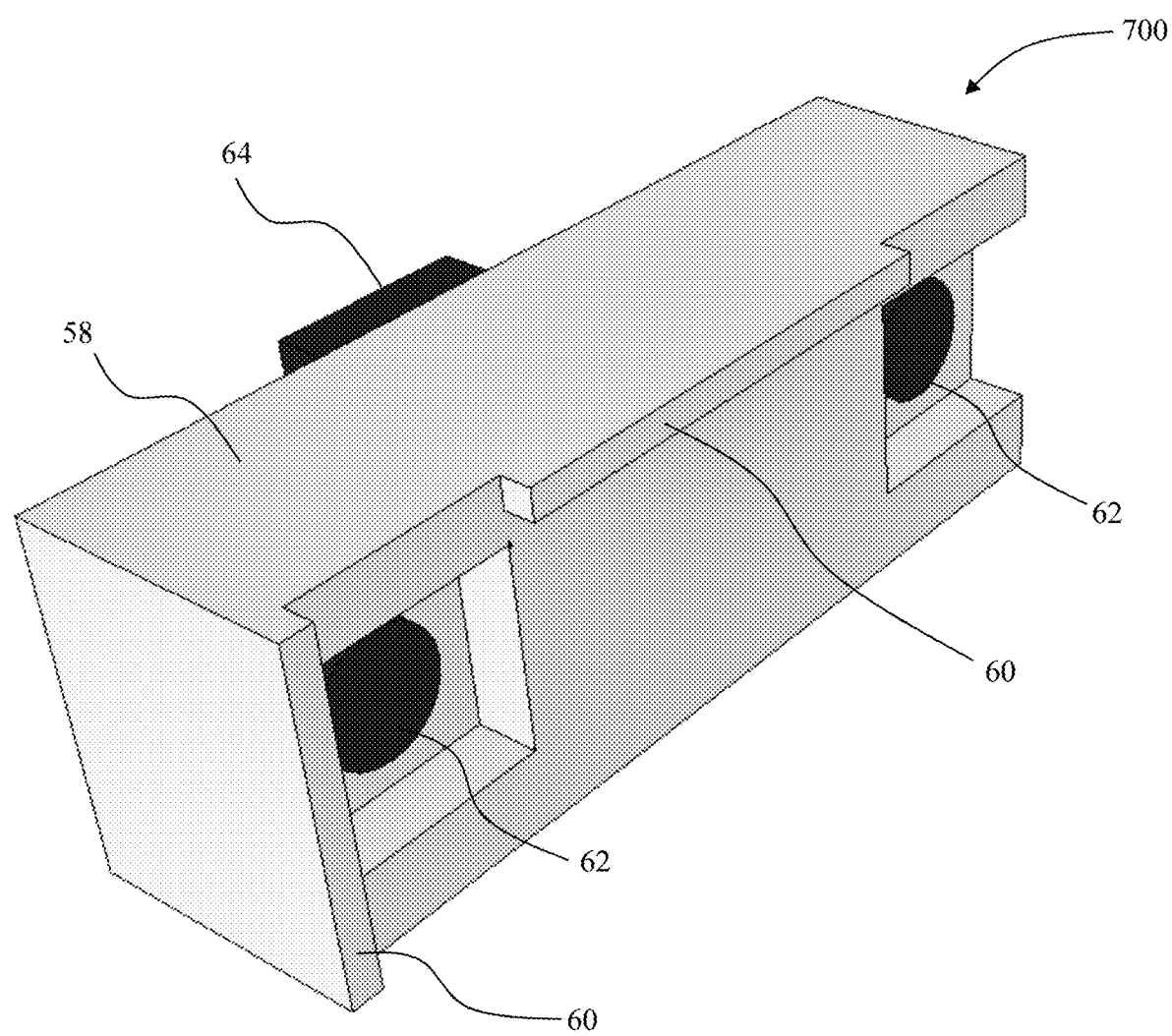
FIG. 7 is an image of a first component, in accordance with an embodiment.

Referring now to FIG. 7, in one embodiment, is a first component 700. Component 600 is affixed to component 700. Component 700 has a raised edge 60 for aligning component 600 into component 700 in a predefined orientation in relation to the sample surface. The top component 200 is fastened to component 700 by contacting the magnet 26 on the top component to metal plates 62 on component 700. A magnet 64 is affixed to the backside of component 700 which is used to fasten component 700 to a prober stand.

According to an embodiment, the board component 600 and the first component 700 could be manufactured together as a single unit.

Figure 8:
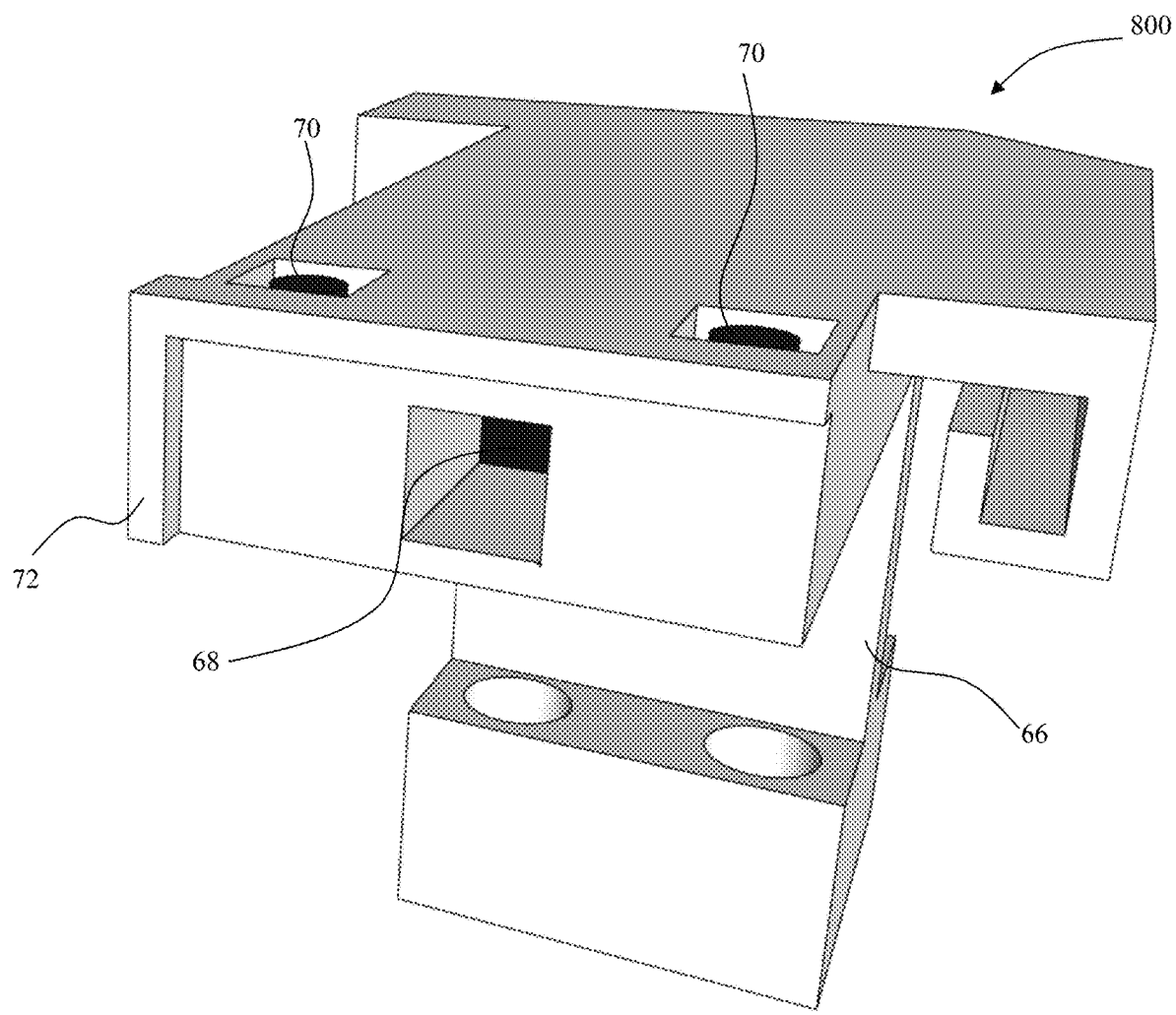
FIG. 8 is an image of a prober stand, in accordance with an embodiment.

Referring now to FIG. 8, in one embodiment, is a prober stand 800. A magnet 68 or metal plate is affixed to component 800. Component 700 is inserted into component 800 where magnet 64 is in proximity or direct contact with magnet 68 or metal plate 68. During probe replacement, the magnets 26 on the top component 200 are attached to metal plate 70 on the prober stand 800. A raised edge feature 72 on the prober stand 800 allows component 700 to be mounted in a predefined orientation in relation to the sample surface.

The prober stand 800 is mounted onto at least a stage. The stage could be a rotating, linear, hexapod or a combination of these stages.

According to an embodiment, the board component 600 could be directly mounted onto the prober stand 800.

According to an embodiment, the probe and the board component 600 could be fabricated together as a single unit on a single substrate. The probe is monolithically integrated with the board component. In such a case, the board component portion of the unit could directly mount onto the first component 700 or the prober stand 800.

Figure 9:
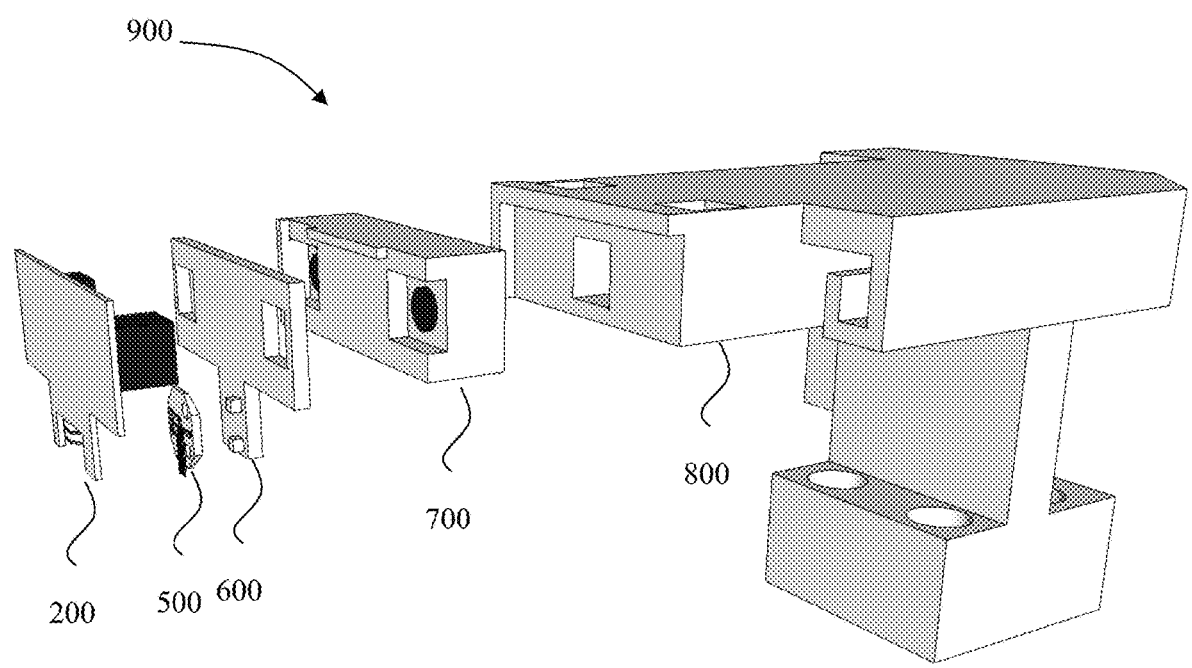
FIG. 9 is an image of the assembly of the various components of the probe head, in accordance with an embodiment.

Referring now to FIG. 9, in one embodiment, is an assembly view of the various components of the probe head.

Figure 10:
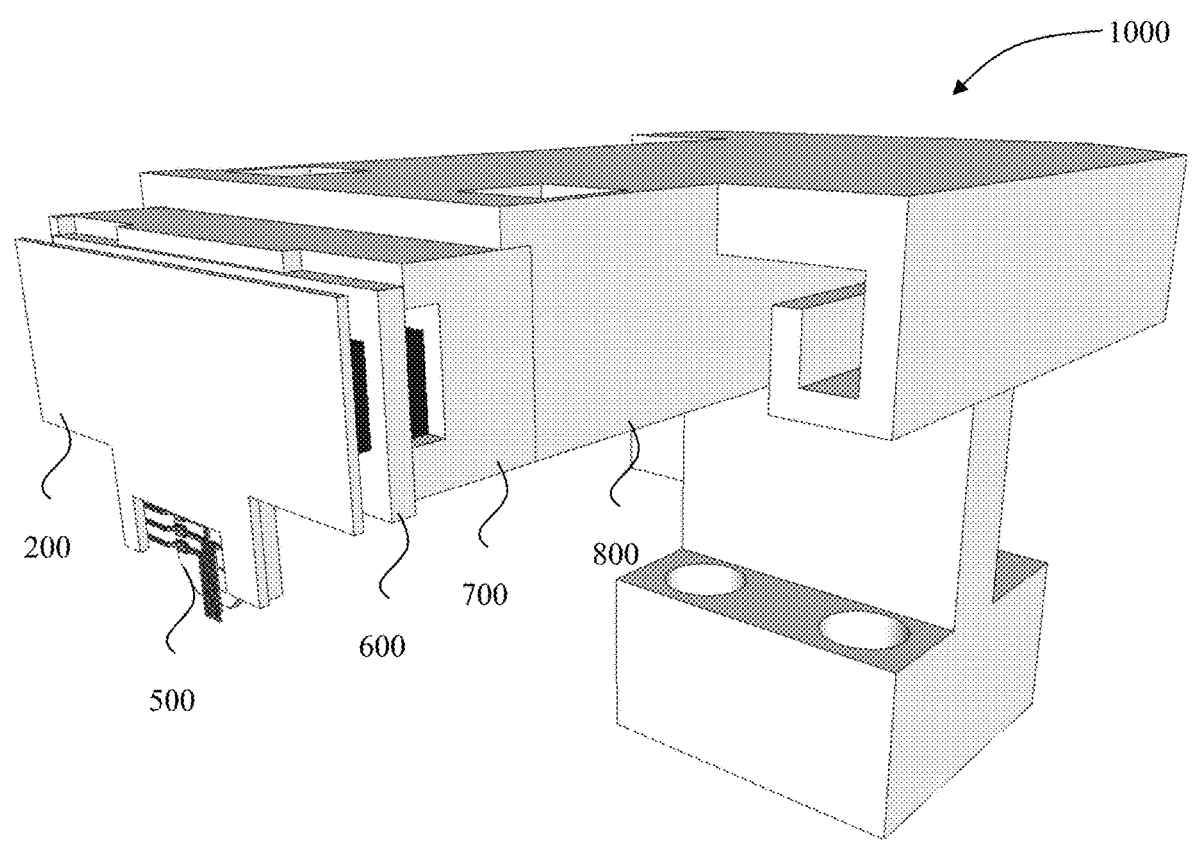
FIG. 10 is an image of the assembly of the various components of the probe head, in accordance with an embodiment.

Referring now to FIG. 10, in one embodiment, is an assembly view of the various components of the probe head where the thickness of the magnets 26 on the top component 200 are used to provide enough pressure to allow the spring-loaded electrodes 28 to contact the pads 42 on the probe.

Figure 11:
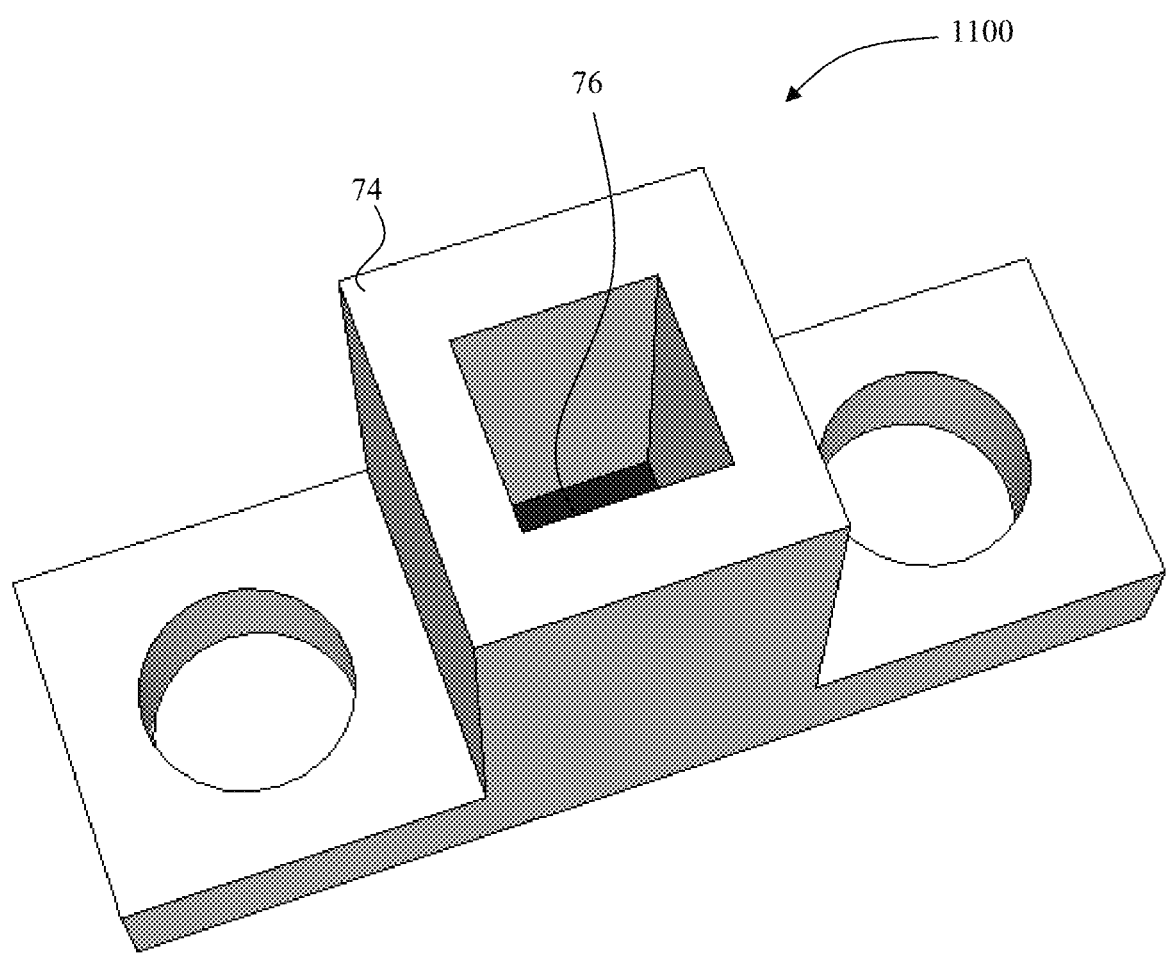
FIG. 11 is an image of a probe exchange stand, in accordance with an embodiment.

Referring now to FIG. 11, in one embodiment, is a probe exchange stand. A magnet 76 or metal plate is affixed to the component 1100.

Figure 12:
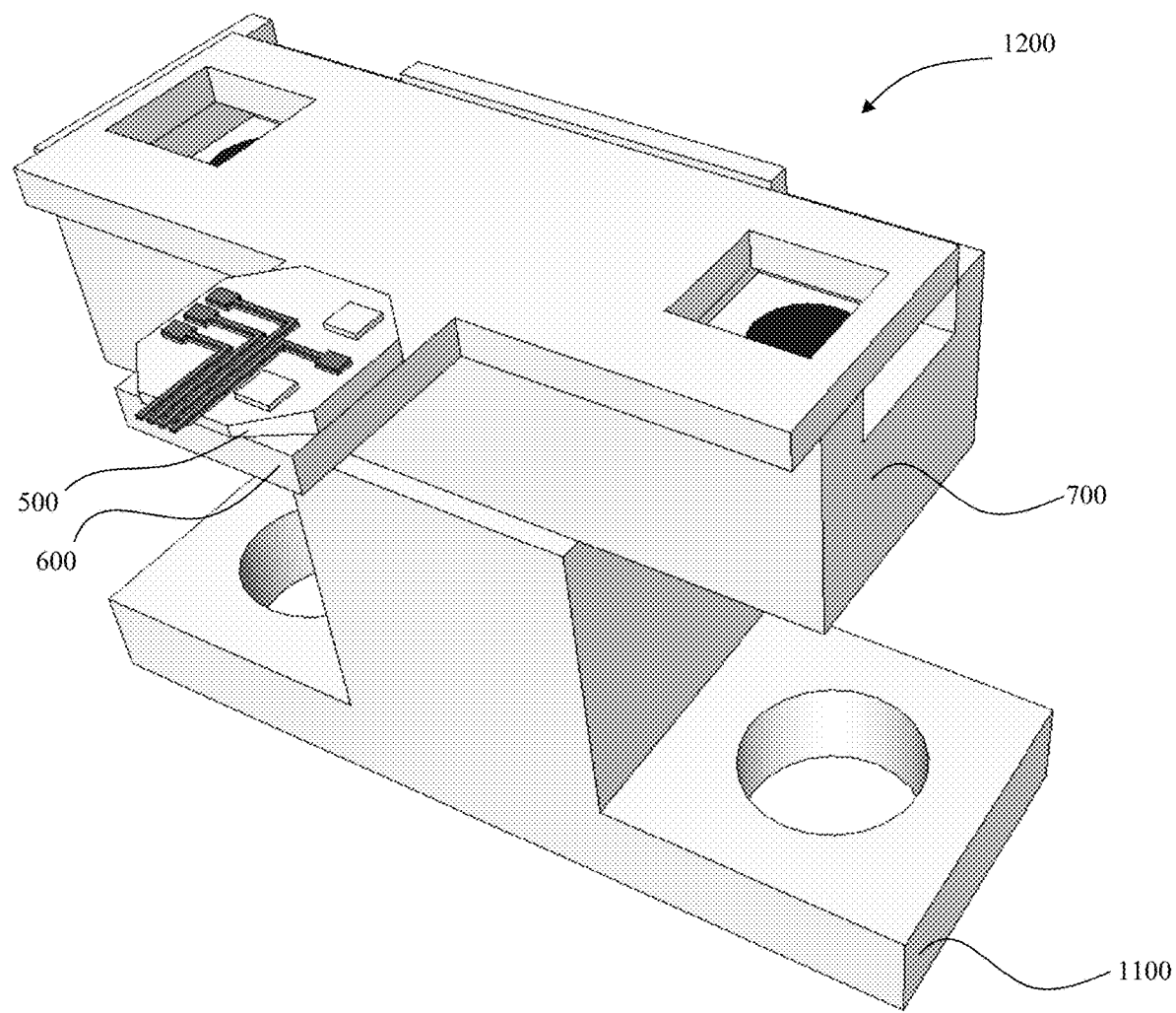
FIG. 12 is an image of how a probe is mounted and demounted from the board component, in accordance with an embodiment.

Referring now to FIG. 12, in one embodiment, the first component 700 is inserted into component 1100. The board component 600 is attached to the first component 700 and the probe 500 is mounted and demounted from the board component 600.

Figure 13:
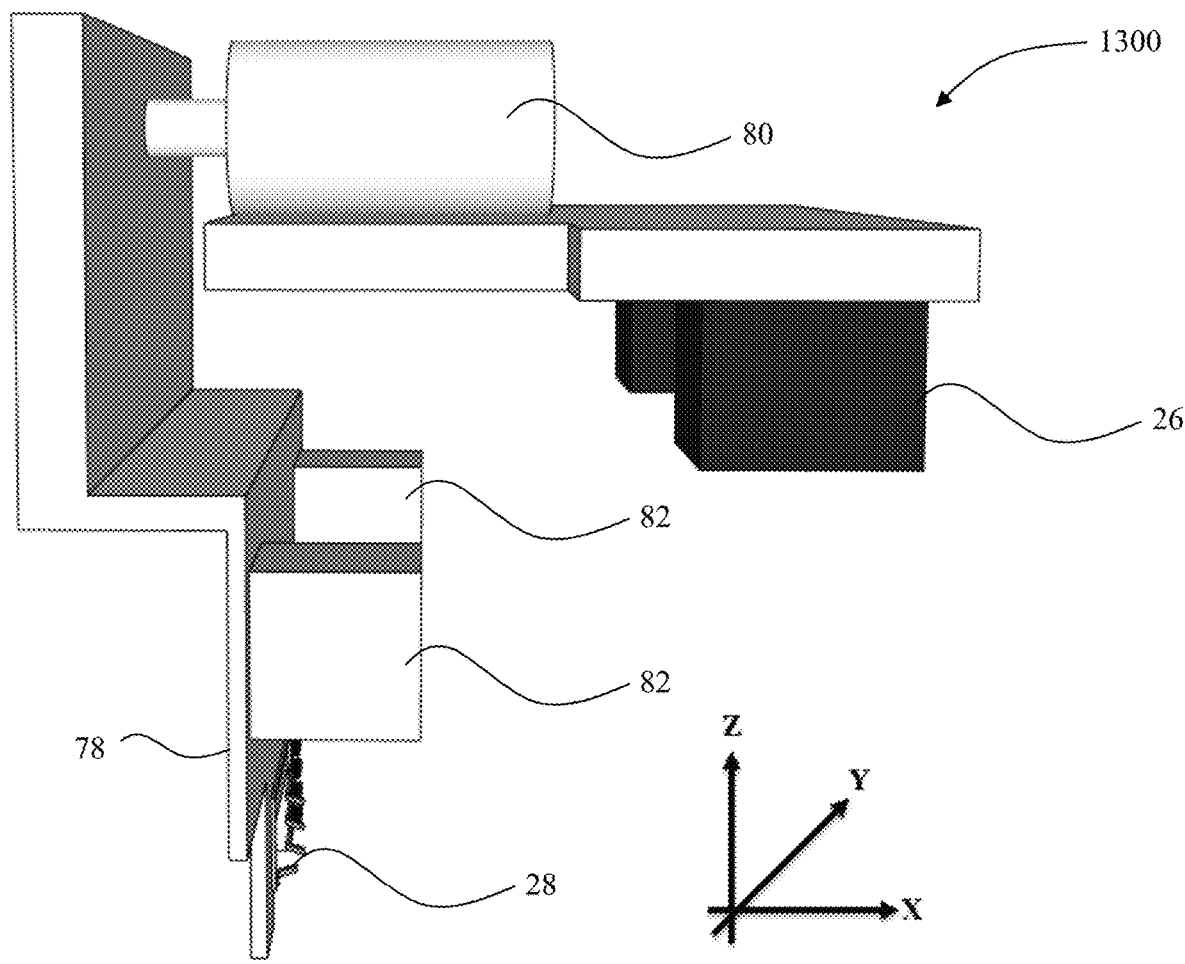
FIG. 13 is an image of an automatic top component with integrated stage(s) or actuators(s), in accordance with an embodiment.

Referring now to FIG. 13, in one embodiment, is an automatic top component 1300. For in-line sample testing, there is a need to automatically mount new probes and demount worn-out probes. The top component 78 with spring-loaded electrodes 28 is integrated with at least a stage or at least an actuator 80. The stage or actuator 80 allows the top component 78 to extend or retract in the X-direction, move laterally in an YZ-plane as well as rotate. The automatic top component 1300 could be directly fused with probe stand 800 or attached using magnets 26. Poles 98 which are not magnets are inserted into the board component 600.

Figure 14:
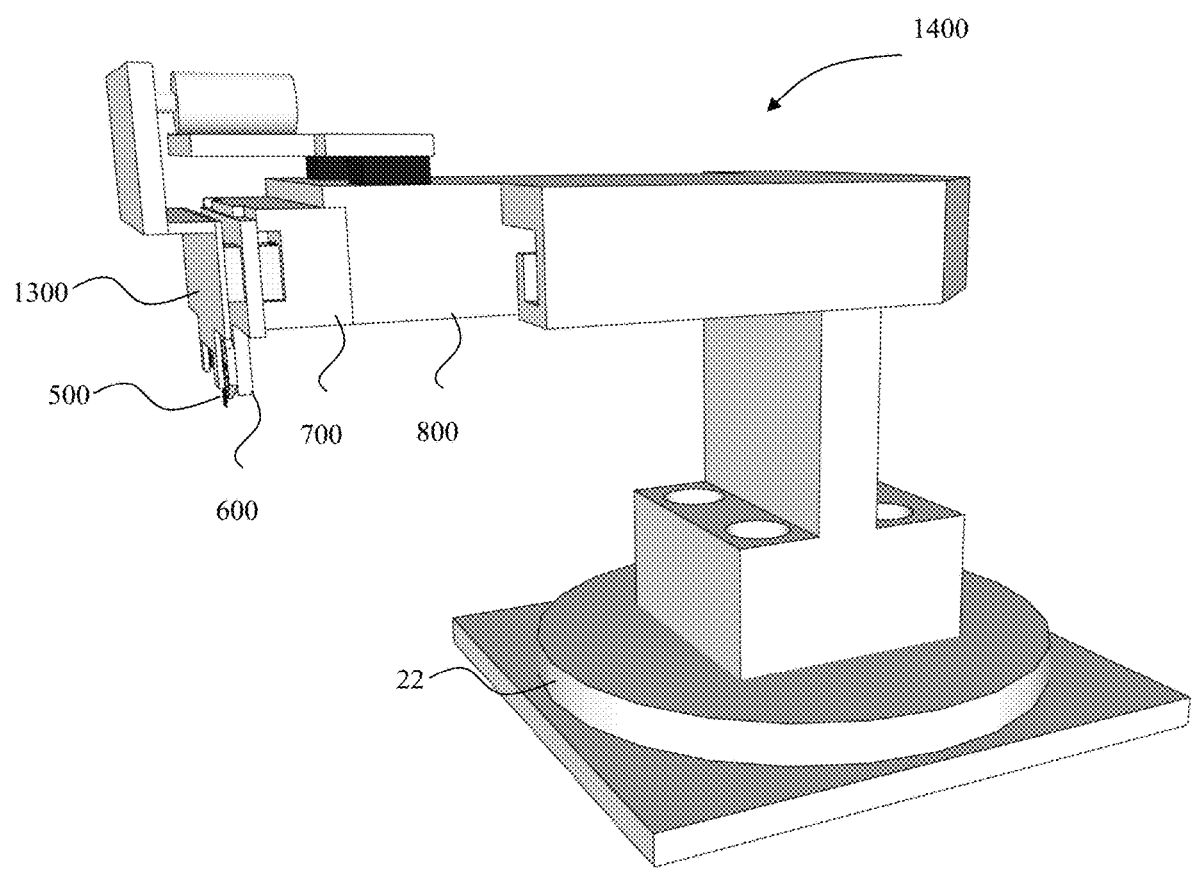
FIG. 14 is an image of the assembly of the various components of the probe head, in accordance with an embodiment.

Referring now to FIG. 14, in one embodiment, is an assembly view of the various components of a probe head.

Figure 15:
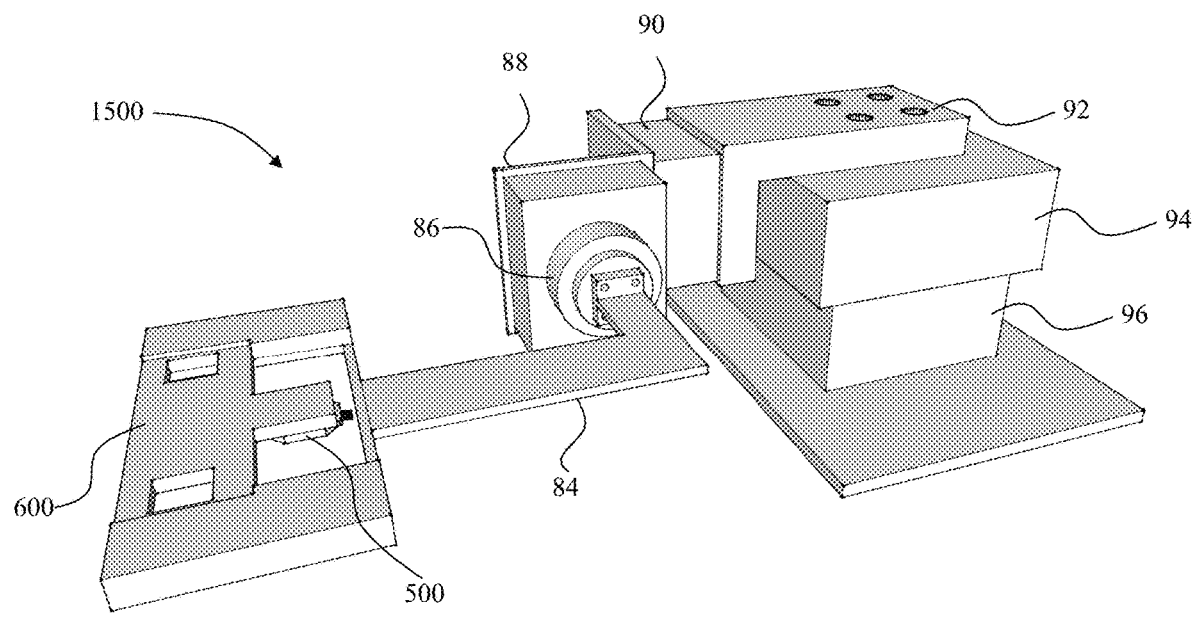
FIG. 15 is an image of an automatic probe handler, in accordance with an embodiment.

Referring now to FIG. 15, in one embodiment, is an automatic probe handler 1500. The probe 500 or the board component 600 which houses the probe is picked up by the probe handler's arm 84. A fastener or suction technique is used to firmly secure the probe or board component 600 to the probe arm. The arm 84 is connected to a rotating stage 86 which is capable of rotating the arm to 90 degrees to allow for insertion of the probe 500 or board component 600 into the adapter assembly 1400. The rotating stage is further connected to a linear stage 90 through an L-bracket 88. The linear stage 90 allows for up and down movement of the arm. The linear stage 90 is further connected to a series of linear stages 94, and 96 through another L-bracket 92.

Figure 16:
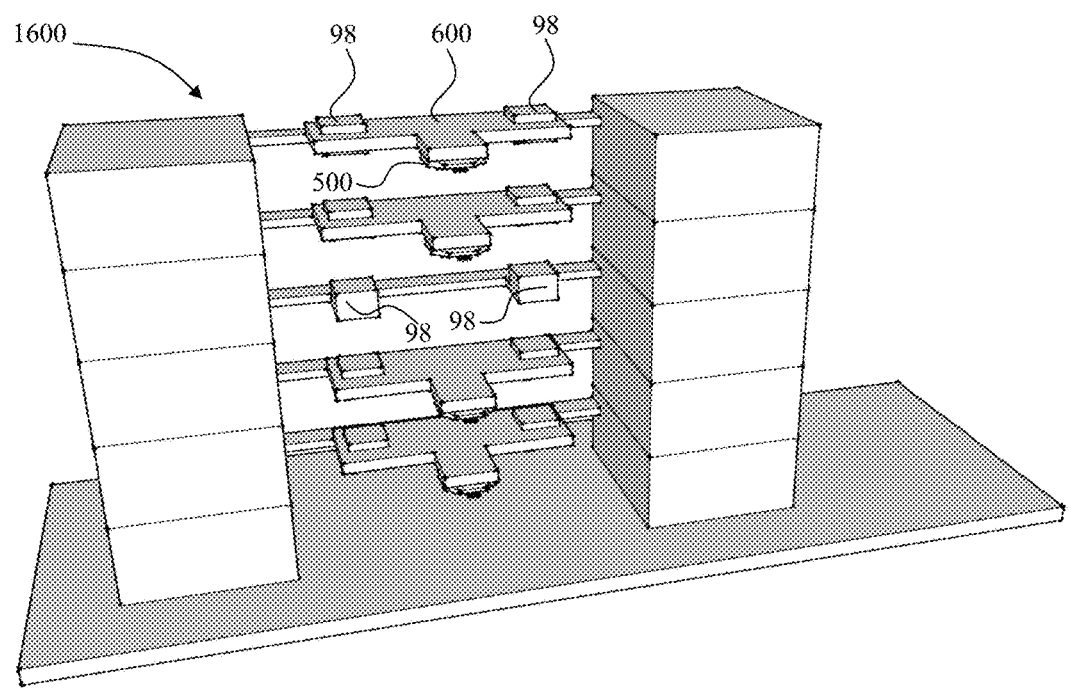
FIG. 16 is an image of a probe cassette, in accordance with an embodiment.

Referring now to FIG. 16, in one embodiment, is a probe cassette 1600. The probe cassette 1600 could be adapted to store probes or board component 600 with a mounted probe. The through-hole 44 in the probe 500 is inserted into the poles 98 on the cassette. The automatic probe handler's arm 84 is used to pick up a new probe or return a used probe to the cassette.

Figure 17:
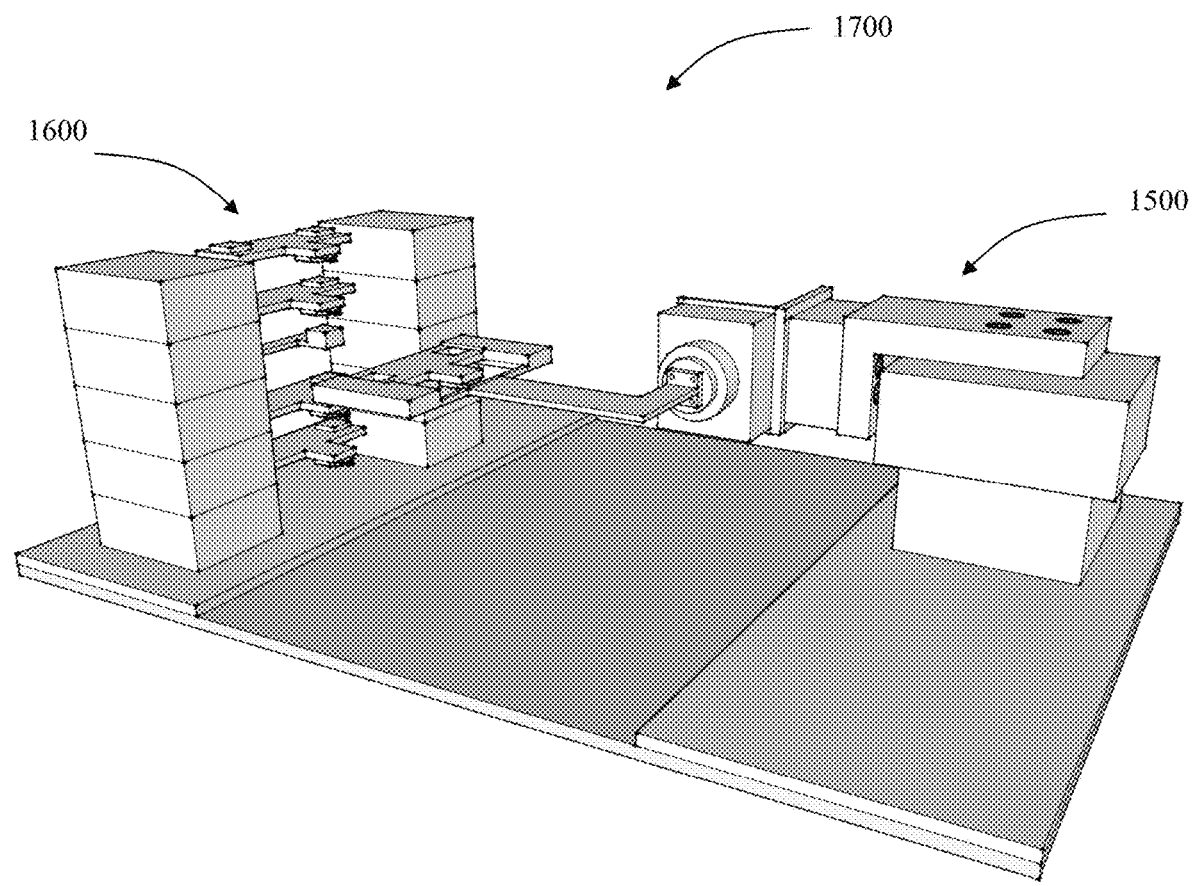
FIG. 17 is an image of the assembly of the automatic probe handler and probe cassette, in accordance with an embodiment.

Referring now to FIG. 17, in one embodiment, is an assembly view of the automatic probe handler 1500 with the probe cassette 1600.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A scanning probe adapter comprising:
a probe head comprising a probe with at least one probe tip affixed to the topside of a single substrate, the single substrate comprising first alignment feature arranged to align and mount the probe onto a board component and the board component comprising a second alignment feature arranged to align and mount the board component with respect to a prober stand; and
a microscope configured to view the at least one probe tip in relation to a sample;
wherein the probe is affixed to the board component, and the board component is affixed to a first component, the first component comprising a fastener on a front side and a backside of the fastener and wherein the fastener is a metal plate or a magnet.

2. The scanning probe adapter of claim 1, wherein the first alignment feature is either a through-hole, indent, pole, or a pattern.

3. The scanning probe adapter of claim 1, wherein the board component comprises a further alignment feature arranged to be aligned with the first alignment feature on the probe.

4. The scanning probe adapter of claim 3, wherein the further alignment feature is either a through-hole, indent, pole, pattern, or a raised edge.

5. The scanning probe adapter of claim 1, wherein the first component comprises a raised edge configured to align the board component in a predefined orientation relative to the sample surface.

6. The scanning probe adapter of claim 1, wherein the probe is affixed to the board component, and the board component is affixed to the first component, and the first component is fastened to the prober stand.

7. The scanning probe adapter of claim 1, wherein the probe is affixed to the board component, and the board component is fastened to the prober stand.

8. The scanning probe adapter of claim 7, wherein the prober stand comprises a raised edge configured to align the board component or the first component in a predefined orientation relative to the sample surface.

9. The scanning probe adapter of claim 8, wherein the prober stand is mounted onto a moving stage.

10. The scanning probe adapter of claim 9, wherein said stage is a rotating stage, a linear stage, or a hexapod stage.

11. The scanning probe adapter of claim 1, wherein the probe and the board component are monolithically integrated as a single unit on a single substrate.

12. The scanning probe adapter of claim 11, wherein the single unit is mounted onto a first component or a prober stand.

13. The scanning probe adapter of claim 1, wherein said probe head houses a top component.

14. The scanning probe adapter of claim 13, wherein said top component houses a spring-loaded electrode, and wherein said spring-loaded electrode is configured to push against and make electrical contact to the board component or the probe comprising the probe tips.

15. The scanning probe adapter of claim 13, wherein said top component is integrated with a stage or an actuator, the stage or actuator configured to provide various degrees of freedom of motion to the top component.

16. The scanning probe adapter of claim 15, wherein said stage or actuator retracts to push the spring-loaded electrode against and make electrical contact to either the board component or the probe comprising the probe tips, and/or extends to disengage contact between the spring-loaded electrode and the board component or the probe comprising the probe tips.

17. A method of mounting a probe to a scanning probe microscope adapter, the method comprising the steps of:
extending a top component of the probe head using a stage or an actuator connected to the top component, the top component comprising a spring-loaded electrode;
picking up, using a probe arm of a probe handler, a probe or a board component which houses a probe;
rotating and/or moving the probe arm of the probe handler to position the spring-loaded electrode of the top component above a topside of the probe;
aligning the top component with the board component or the probe using at least one alignment feature located on the board component or at least one alignment feature located on the probe head; and
retracting the stage or actuator to push the spring-loaded electrode against the board component or the probe comprising the probe tips, wherein the spring-loaded electrode makes electrical contact to the board component or probe comprising the probe tips;
wherein the probe is affixed to the board component, and the board component is affixed to a first component, the first component comprising a fastener on a front side and a backside of the fastener and wherein the fastener is a metal plate or a magnet.

18. The method of claim 17, wherein the probe arm picks up the board component or the probe comprising the probe tips from a probe cassette.

19. A method of demounting a probe from a scanning probe microscope adapter, the method comprising the steps of:
extending a top component of the probe head using a stage or an actuator connected to the top component, wherein extending the top component disengages contact between a spring-loaded electrode and either a board component housing a probe or a probe comprising at least one probe tip; and picking up, using a probe arm of a probe handler, the probe or the board component; and moving and/or rotating the probe arm to demount the probe from the scanning probe microscope adapter;

wherein the probe is affixed to the board component, and the board component is affixed to a first component, the first component comprising a fastener on a front side and a backside of the fastener and wherein the fastener is a metal plate or a magnet.

20. The method of claim 19, further comprising the step of inserting, using the probe arm, the board component or the probe comprising the probe tips into a probe cassette.

* * * * *